March 25, 1924.

C. R. WILSON ET AL 1,488,184

BOTTOM SCREW CAM FOR GILL DRAWING FRAMES

Filed July 27, 1923    2 Sheets-Sheet 1

Inventors.
Charles R. Wilson
Charles R. Scott
By Southgate & Southgate
Attorneys March 25, 1924.
C. R. WILSON ET AL
1,488,184
BOTTOM SCREW CAM FOR GILL DRAWING FRAMES
Filed July 27, 1923     2 Sheets-Sheet 2
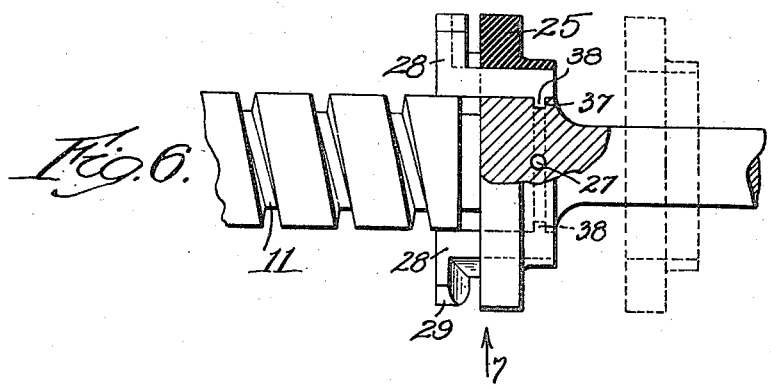
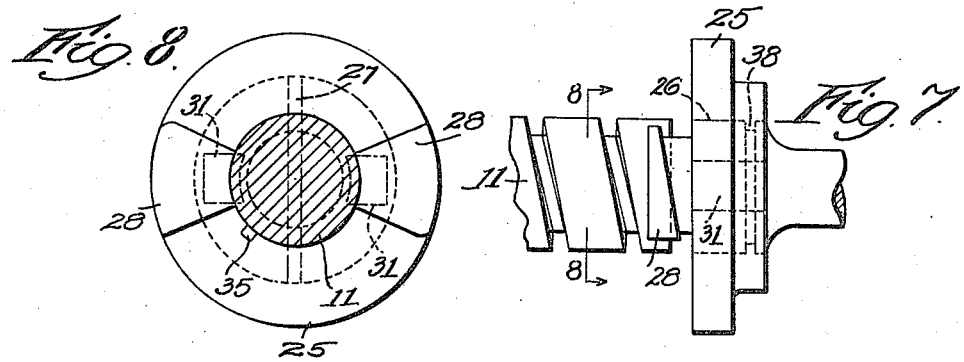
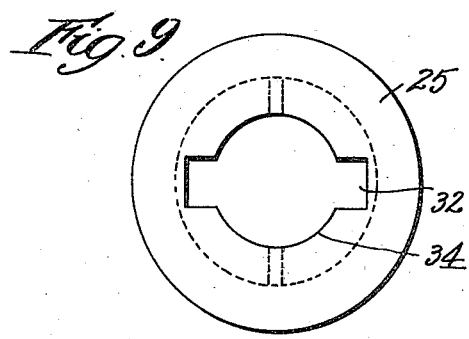
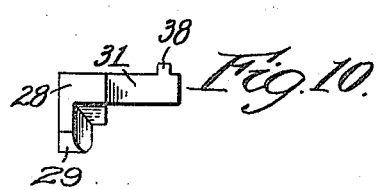
Inventors.
Charles R. Wilson.
Charles F. Scott
By attorneys
Southgate & Southgate.

Patented Mar. 25, 1924.

1,488,184

UNITED STATES PATENT OFFICE.

CHARLES R. WILSON, OF PROVIDENCE, RHODE ISLAND, AND CHARLES R. SCOTT, OF WESTBORO, MASSACHUSETTS, ASSIGNORS TO GILL SCREW ASSOCIATES, OF WORCESTER, MASSACHUSETTS, A CORPORATION OF MASSACHUSETTS.

BOTTOM-SCREW CAM FOR GILL DRAWING FRAMES.

Application filed July 27, 1923. Serial No. 654,288.

*To all whom it may concern:*

Be it known that we, CHARLES R. WILSON and CHARLES R. SCOTT, both citizens of the United States, said WILSON residing at Providence, in the county of Providence and State of Rhode Island, said SCOTT residing at Westboro, county of Worcester, and State of Massachusetts, have invented a new and useful Bottom-Screw Cam for Gill Drawing Frames, of which the following is a specification.

This invention relates to a pair of cams for the bottom screw of a gill drawing frame and the means for securing the same to the screw.

The principal objects of the invention are to provide a simplified form of cam and mount it in such a manner that it can be easily assembled with the screw and shaft and also easily disconnected therefrom and yet arranged in such a way that it cannot be put on in the wrong place or the wrong way around.

The invention involves a construction which reduces the cost of manufacture and assembling.

Other objects and advantages of the invention will appear hereinafter.

Reference is to be had to the accompanying drawings in which—

Figs. 6 to 10 are respectively similar views of a modification.

Figure 1:
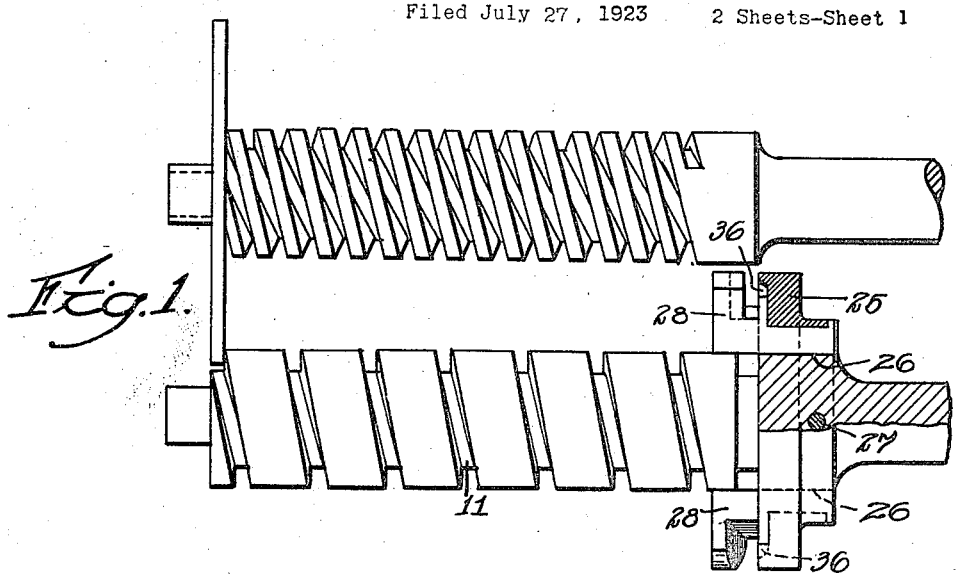
Figs. 1 and 2 are respectively a plan and a side view of the end of the bottom screw of a gill drawing frame showing cams applied thereto constructed in accordance with this invention.
Figure 3:
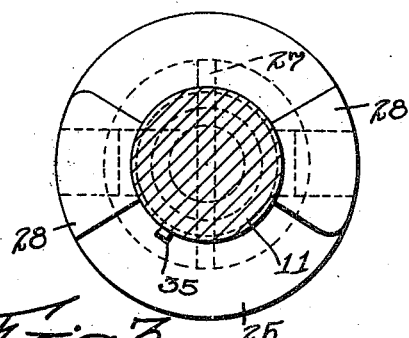
Fig. 3 is a face view of the same showing the screw in transverse section.
Figure 2:
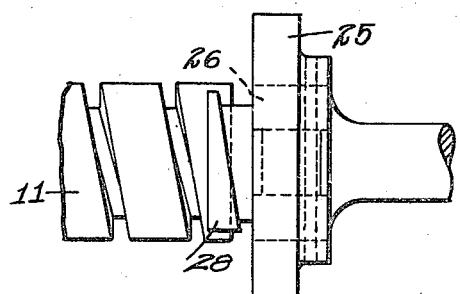

This invention relates to the bottom screw only of a gill drawing frame. The bottom screw 11 which is illustrated is usually provided with an integral head 25. In this case, however, the method of connection is simplified by making this head detachable from the screw by providing it with a passage so that it can be put on over the end of the screw. The latter has a cylindrical shoulder 26 fitting the interior of the head and a diametrical perforation through which passes a pin 27 as shown on both sheets. In sheet one the head 25 is also provided with a registering perforation through which the ends of this pin project. This is for securing these two parts together positively.

The usual double cam is formed in two parts in this case, each cam 28 being made separately but just alike. Each of these cams has a face 29 of the usual shape having an outer diameter equal to the largest diameter of the head and an inner diameter equal to that of the screw so that a concave arc is provided on the inner side of each cam adapted to fit and engage the circumference of the screw at or near its end. The face 29 is spaced from the head 25 and provided with a shoulder 30 which fits in a depression 36 therein. The cam is also provided with a shank 31 which projects through an opening 32 in the head and with a toe 33 setting into a notch in the rear of the head. The inner surface of this shank has a curvature to fit the screw when assembled in place.

Figure 4:
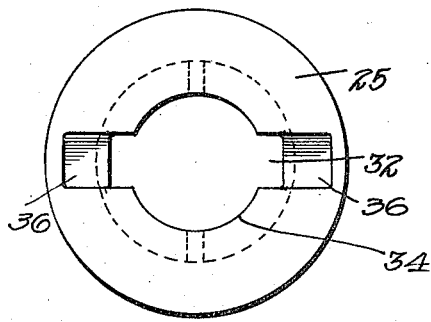
Fig. 4 is a view similar to Fig. 3 showing the end of the shaft with the cams and screw omitted.
Figure 5:
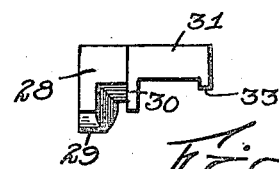
Fig. 5 is a side view of one of the cams.

In assembling the parts the head, as shown in Fig. 4, is held in a convenient position and two of the cams are let down into the central passage 34 through the head and pushed out into the passages 32 opposite each other and forced outward radially so that the toes 33 project into their respective notches and the shoulders 30 fit against the outer supporting surfaces on the head. This brings the two cams 28 into proper position opposite each other on the head. Now the head and cams are moved over the shoulder 26, and as it just fits the inner surface, it will prevent the cams from moving inwardly toward each other. The walls of the perforations 32 will prevent their moving sideways. The head is then fixed to the screw by means of the pin 27 which is driven in and held frictionally and all parts therefore are securely held in position. If desired, a key-way 35 can be provided and a corresponding key to hold the screw and the head circumferentially with respect to each other while the parts are being assembled and prevent the screw from being put in in any way except in one position.

In the form shown in the second sheet most of the features above mentioned are retained. But each cam 28 has an inwardly projecting toe 38 entering a circumferential groove 37 in the shoulder 26. Therefore the outside surface of each cam is without projections and the cams can first be applied to the screw and the collar or head 25 located in position by sliding it alone over the shank of the screw.

In this way a very simple arrangement is provided for holding the two cams. These cams are made exactly alike so that the work of manufacturing the pair is considerably reduced and they are held positively in position. They cannot be located in the wrong position in any way because they will not fit anywhere except in the right position. This forms a positive connection and a unitary structure which can be manipulated in any desired way and when once assembled need not be taken down except for repair or wear. As the cams sustain most of the wear, the life of the whole device can be greatly increased by replacing the cams from time to time when worn or in case of breakage. Thus economy is introduced in the original manufacture and also in the durability and length of life of the device.

Although we have illustrated and described only two forms of the invention, we are aware of the fact that modifications can be made therein by any person skilled in the art without departing from the scope of the invention as expressed in the claims.

Therefore we do not wish to be limited to all the details of construction herein shown and described but what we do claim is:—

1. The combination with the bottom screw for a gill drawing frame, of a head detachably connected thereto, said head having a passage therethrough for the screw, a pair of passages communicating therewith and on opposite sides thereof, and a pair of entirely separate cams having shanks located in the last named passages opposite each other and adapted to be held therein by the surface of the screw alone when the latter is fixed in position on the head.

2. The combination with the bottom screw for a gill drawing frame having a cylindrical shoulder, of a head having a circular passage for the shoulder, means for positively uniting the head and screw, said head also having a pair of passages parallel with the first named passage communicating therewith, each one having a notch on the rear side, and a pair of bottom cams adapted to be held in said passages and to project from the side of the screw, each cam having a shoulder for engaging the face of the head, a shank fitting its passage through the head, and a toe on the end of the shank for engaging in said notch.

3. As an article of manufacture, a single cam for the bottom screw of a gill drawing frame having a cam portion, a shoulder under it, a shank extending therefrom to the rear, and a toe projecting at right angles from the shank at its end for the purpose described.

4. The combination with the bottom screw for a gill drawing frame having a circular shoulder, of a head having a circular passage therefor and having a pair of passages communicating with the first named passage, each one having a notch on the rear side, and a pair of cams adapted to be held in said passages and to project from the side of the screw, each cam having a cam surface, a shoulder underneath it for engaging the face of the head, a shank fitting its passage through the head, and a toe on the end of the shank for engaging in said notch, whereby the cams can be made exactly alike and introduced into the central passage of the head and forced outwardly in opposite radial directions so as to be received in their respective passages and fastened permanently therein by the introduction of the screw into the central passage in the head.

In testimony whereof we have hereunto affixed our signatures.

CHARLES R. WILSON.
CHARLES R. SCOTT.